United States Patent
Byun et al.

(10) Patent No.: US 9,913,144 B2
(45) Date of Patent: Mar. 6, 2018

(54) METHOD AND APPARATUS FOR INDICATING CELL SPLITTING PATTERN

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/300,763

(22) PCT Filed: Sep. 23, 2015

(86) PCT No.: PCT/KR2015/010025
§ 371 (c)(1),
(2) Date: Sep. 29, 2016

(87) PCT Pub. No.: WO2016/088995
PCT Pub. Date: Jun. 9, 2016

(65) Prior Publication Data
US 2017/0026846 A1    Jan. 26, 2017

Related U.S. Application Data

(60) Provisional application No. 62/086,124, filed on Dec. 1, 2014.

(51) Int. Cl.
*H04W 16/10*    (2009.01)
*H04W 24/02*    (2009.01)
(Continued)

(52) U.S. Cl.
CPC .......... *H04W 16/10* (2013.01); *H04W 24/02* (2013.01); *H04W 16/28* (2013.01); *H04W 88/08* (2013.01); *H04W 92/20* (2013.01)

(58) Field of Classification Search
CPC ..... H04W 16/10; H04W 16/28; H04W 24/02; H04W 92/20
See application file for complete search history.

(56) References Cited

U.S. PATENT DOCUMENTS 5,966,668 A * 10/1999 Lindroth ............... H04W 84/14
455/446
6,151,512 A * 11/2000 Chheda ................. H04W 16/00
370/331
(Continued)

FOREIGN PATENT DOCUMENTS

WO    2014154277 A1    10/2014

OTHER PUBLICATIONS

Ericsson, "Analysis of SON for AAS cell splitting scenarios", 3GPP TSG-RAN WG3#83, R3-140319, Feb. 1, 2014, 5 pages.
(Continued)

*Primary Examiner* — Rasheed Gidado
(74) *Attorney, Agent, or Firm* — Lee Hong Degerman Kang Waimey

(57) ABSTRACT

The present invention relates to a method and apparatus for indicating a cell splitting pattern to a neighboring base station. A base station may perform cell splitting, and transmit, to the neighboring base station, coverage information representing the current shape of the split cells of the base station, determined by the cell splitting. In addition, the base station may further transmit, to the neighboring base station, index information indicating the current cell splitting pattern preconfigured between the base station and the neighboring base station. The neighboring base station may apply a set of mobility robustness optimization (MRO) parameters on the basis of the received coverage information.

11 Claims, 22 Drawing Sheets

(51) Int. Cl.
*H04W 88/08* (2009.01)
*H04W 92/20* (2009.01)
*H04W 16/28* (2009.01)

(56) References Cited

U.S. PATENT DOCUMENTS

| | | | |
|---|---|---|---|
| 2005/0192031 A1* | 9/2005 | Vare | H04W 36/32 455/456.6 |
| 2014/0301369 A1* | 10/2014 | Kubota | H04W 36/0083 370/331 |
| 2015/0223185 A1* | 8/2015 | Harris | G01S 5/0236 455/456.5 |
| 2016/0044518 A1* | 2/2016 | Centonza | H04W 24/02 370/328 |
| 2016/0066312 A1* | 3/2016 | Centonza | H04W 72/0426 370/329 |

OTHER PUBLICATIONS

ISN, "Analysis of the AAS-based techniques", 3GPP TSG-RAN WG3 Meeting #81, R3-131317, Aug. 9, 2013, 6 pages.
Catt et al., "Impact analysis of AAS on SON", 3GPP TSG RAN WG3 Meeting #81, R3-131558, Aug. 22, 2013, 3 pages.
New Postcom, "Discussions on intra-cell sectorization", 3GPP TSG RAN WG3 Meeting #80, R3-130898, May 11, 2013, 5 pages.
LG Electronics inc., "Use case considering multiple patterns for cell splitting", 3GPP TSG-RAN WG3 Meeting #86, R3-142868, Nov. 8, 2014, 2 pages.
Fujitsu, "Considerations on Procedure of Cell Splitting/Merging", 3GPP TSG-RAM WG3 #86, R3-142887, Nov. 8, 2014, 3 pages.
CATT, "Discussion on indication for AAS", 3GPP TSG RAN WG3 Meeting #86, R3-142742, Nov. 8, 2014, 3 pages.
Nokia Networks, "Cell relation information for the eNB configuration update", 3GPP TSG-RAN WG3 Meeting #86, R3-142714, Nov. 7, 2014, 11 pages.

* cited by examiner (a)

(b)

(a)

(b)

(a)

(b)

METHOD AND APPARATUS FOR INDICATING CELL SPLITTING PATTERN

CROSS-REFERENCE TO RELATED APPLICATIONS

This application is the National Stage filing under 35 U.S.C. 371 of International Application No. PCT/KR2015/010025, filed on Sep. 23, 2015, which claims the benefit of U.S. Provisional Application No. 62/086,124, filed on Dec. 1, 2014, the contents of which are all hereby incorporated by reference herein in their entirety.

BACKGROUND OF THE INVENTION

Field of the Invention

The present invention relates to a method and an apparatus for indicating a cell splitting pattern to a neighboring base station, and more particularly to a method and an apparatus for a base station to indicate a cell splitting pattern to a neighboring base station such that the neighboring base station changes and applies a mobility robustness optimization (MRO) parameter corresponding to cell splitting of the base station as one of active antenna system (AAS) techniques.

Related Art

With the development of wireless communication systems and the wide use of smart devices in recent years, demands for wireless data are steadily increasing, and this trend is expected to continue. One of crucial issues in a wireless communication system is the efficient use of frequencies.

Beamforming is an antenna technique for concentrating energy radiated from an antenna in a specific direction in a space. Beamforming is intended to receive a signal with higher strength from a desired direction or to transmit a signal with intensive energy in a desired direction. In particular, a beamforming system is required to achieve various forms of high-gain beams for high speed and high capacity of a wireless communication system. For example, a beamforming system may be used for high-speed transmission/reception communications of high-capacity data for multiple users and communications in a high pass loss band, such as diverse satellite aeronautical communications using a smart antenna including a satellite antenna and an aeronautical antenna. Therefore, studies are being conducted on beamforming communications for a variety of fields, such as next-generation mobile communications, various kinds of radar, military and aerospace communications, indoor and inter-building high-speed data communications, a wireless local area network (WLAN), a wireless personal area network (WPAN), and the like.

Furthermore, as the development of an active antenna system (AAS) enables relatively free beamforming in recent years, an attempt to apply vertical sectorization is being made. Unlike the existing stationary antenna system, the AAS is a system in which an actuator is installed to remotely control an antenna in position and direction, which is capable of dynamically changing antenna settings according to a cell characteristic or user service demand. This technique enables more efficient use of frequencies to increase frequency efficiency by about 50% as compared with the existing technology. Thus, AAS functions may be effectively used generally for scenarios, such as congestion with a large number of UEs, a high traffic demand, and a temporary or steady concentration of UEs on a specific area.

A self-organizing network (SON) is an automation technology in installation and management of a base station for efficient and reliable network management and includes self-configuration, self-optimization, and self-healing functions.

SUMMARY OF THE INVENTION

The present invention discloses a method and an apparatus for indicating a cell splitting pattern to a neighboring base station. A base station may transmit a message indicating a cell splitting pattern of the base station to a neighboring base station, and the neighboring base station may change and apply a mobility robustness optimization (MRO) parameter set based on the received cell splitting pattern. The message indicating the cell splitting pattern may be transmitted through an X2 connection between the base station and the neighboring base station, and the cell splitting pattern may be index information indicating a current cell splitting pattern or coverage information representing a shape of a split cell.

According to one embodiment, there is provided a method for a base station to indicate a cell splitting pattern to a neighboring base station.

The method may include performing cell splitting; and transmitting, to the neighboring base station, coverage information representing a shape of a currently split cell of the base station, which is determined by the cell splitting.

The method may further include transmitting, to the neighboring base station, index information indicating a current cell splitting pattern preconfigured between the base station and the neighboring base station.

The coverage information equal to 0 (zero) may indicate a deactivated cell of the base station, and the coverage information equal to a value other than 0 may indicate an activated cell of the base station and the shape of the currently split cell corresponding to the coverage information.

The neighboring base station may apply a set of mobility robustness optimization (MRO) parameters based on the received coverage information.

The set of MRO parameters may change according to the coverage information.

The coverage information may be transmitted to the neighboring base station through a cell splitting pattern indication message, an eNB configuration update message, or a different message, and the index information may be transmitted to the neighboring base station through a cell splitting pattern indication message, an eNB configuration update message, or a different message.

The base station may be connected with the neighboring base station via X2.

According to another embodiment, there is provided a base station for indicating a cell splitting pattern to a neighboring base station. The base station may include a memory, a transceiver, and a processor to connect the memory and the transceiver, in which the processor may be configured to perform cell splitting and to control the transceiver to transmit, to the neighboring base station, coverage information representing a shape of a currently split cell of the base station, which is determined by the cell splitting.

The processor may be configured to control the transceiver to further transmit, to the neighboring base station, index information indicating a current cell splitting pattern preconfigured between the base station and the neighboring base station The coverage information equal to 0 (zero) may indicate a deactivated cell of the base station, and the coverage information equal to a value other than 0 may indicate an activated cell of the base station and the shape of the currently split cell corresponding to the coverage information.

The coverage information may be transmitted to the neighboring base station through a cell splitting pattern indication message, an eNB configuration update message, or a different message, and the index information may be transmitted to the neighboring base station through a cell splitting pattern indication message, an eNB configuration update message, or a different message.

A base station indicates a cell splitting pattern to a neighboring base station, and the neighboring base station applies an MRO parameter based on the cell splitting pattern, thereby reducing failure of a handover by cell splitting.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
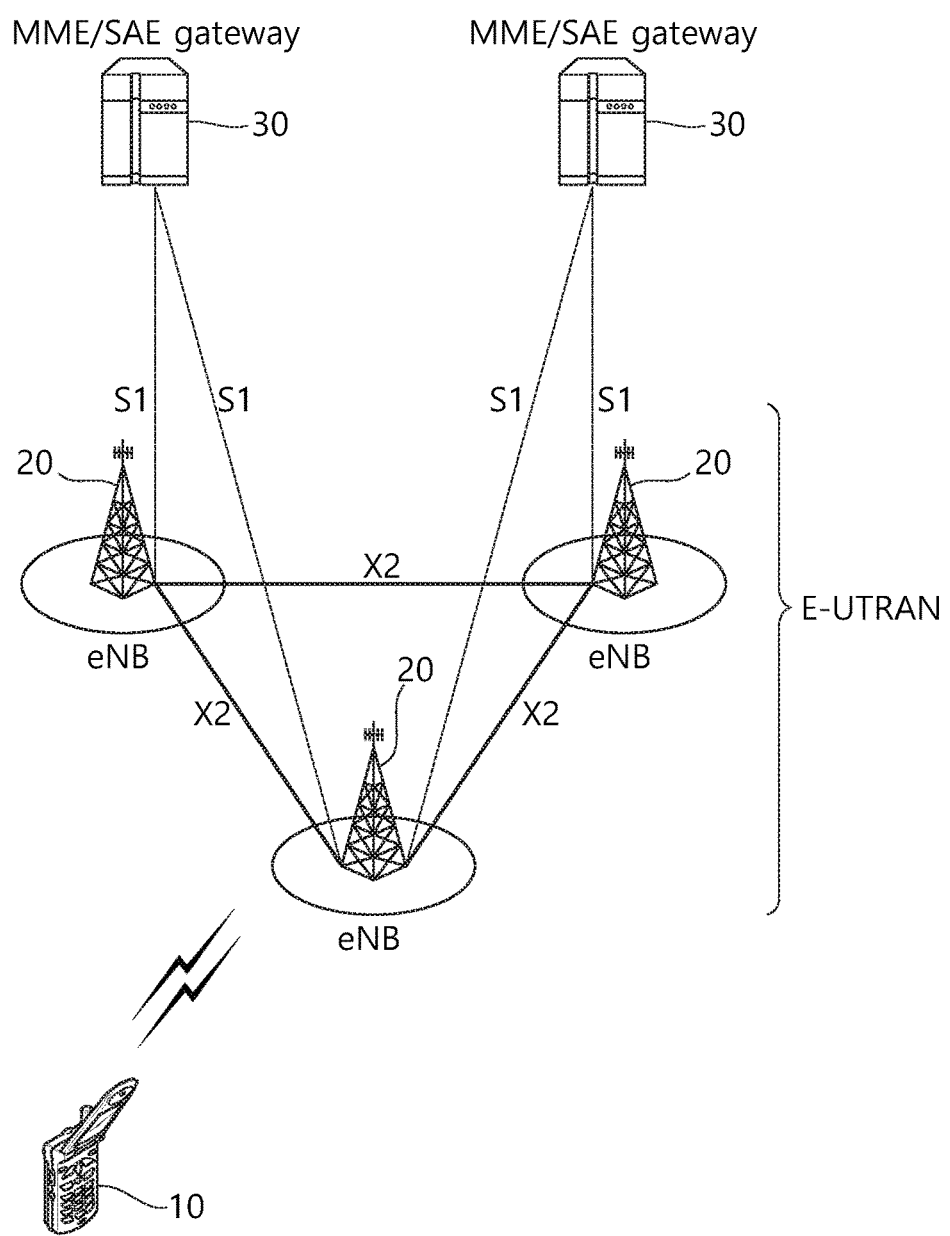
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

An EPC includes a mobility management entity (MME) and a system architecture evolution (SAE) gateway (S-GW). One or more MMEs/S-GWs 30 may be disposed at the end of a network and may be connected with an external network. For clarity, an MME/S-GW 30 may be simply referred to as a gateway hereinafter, in which it would be understood that the gateway includes both an MME and an S-GW.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an Si interface.

Figure 2:
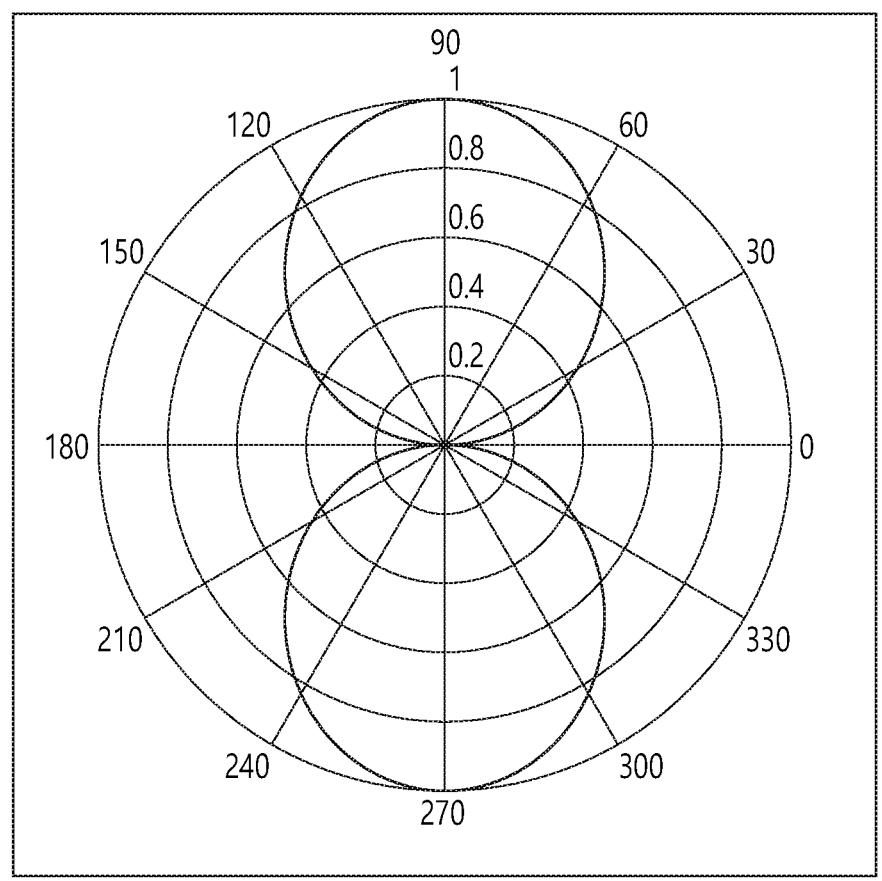
FIG. 2 illustrates a radiation pattern of a half-wave dipole antenna.
Figure 2:
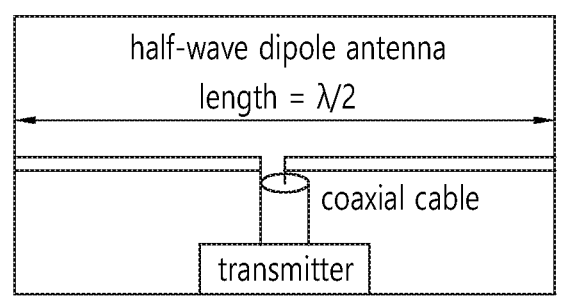

FIG. 2 illustrates a radiation pattern of a half-wave dipole antenna.

A half-wave dipole antenna is a simple half-way antenna in which a wire is connected to a disconnected central portion for cable connection. A directional antenna is designed to have gain in only one direction and to have loss in other directions. As an antenna increases in size, directivity thereof is created. A wave radiated from an antenna travels a long distance with directivity and may be more easily controlled when given a directional radiation pattern which is constructive interference or unconstructive interference.

Figure 3:
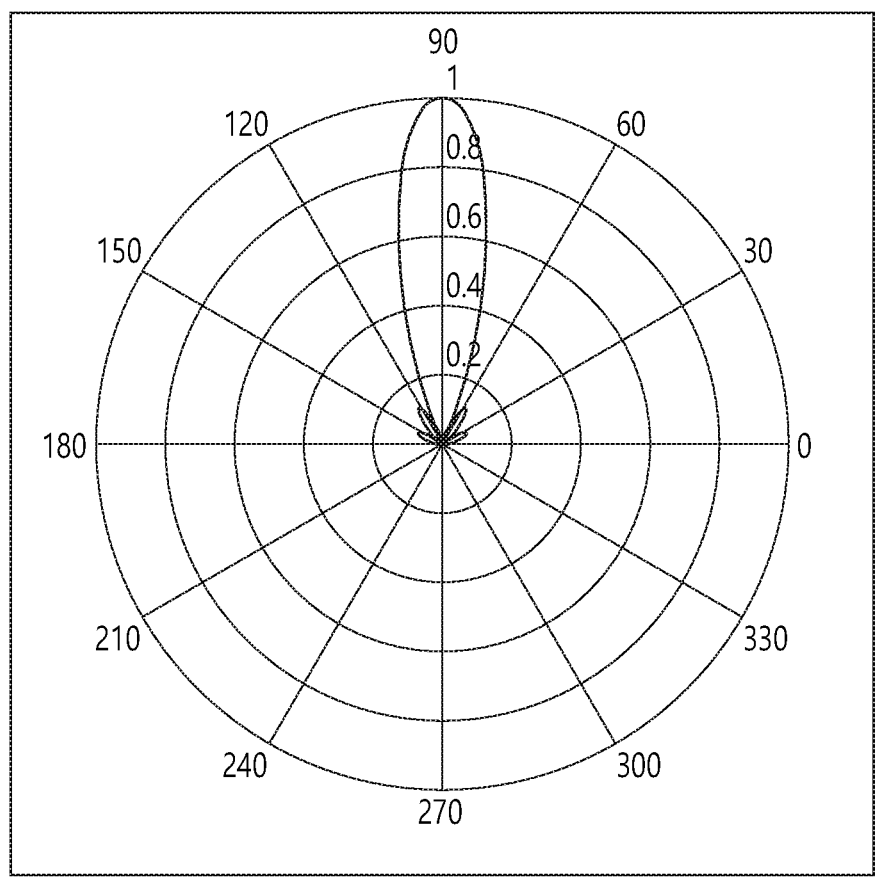
FIG. 3 illustrates a radiation pattern of a circular aperture antenna such as a satellite receiving antenna.
Figure 3:
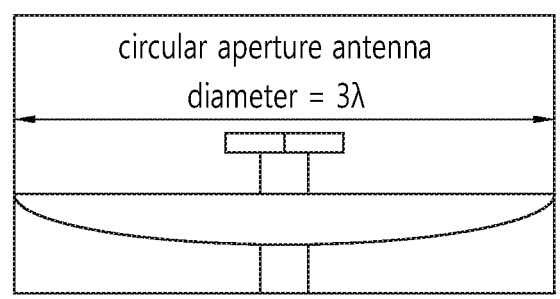

FIG. 3 illustrates a radiation pattern of a circular aperture antenna, such as a satellite receiving antenna.

To be extremely simplified, a satellite receiving antenna is considered to be a circular surface from which the same electromagnetic waves are radiated in all parts. Referring to FIG. 3, a beam with a narrow width having a high gain is disposed at the center of the radiation pattern. As the diameter of the antenna increases according to a wavelength, the width of the central beam becomes gradually narrow. Small beams called side lobes appear on both sides of the central beam. The direction of a signal with a signal strength of 0 may be expressed as "nulls." A simple directional antenna is constructed from a linear array of small radiating antenna elements, and the same signal with the same amplitude and the same phase is provided from one transmitting end to each antenna element. As the entire width of the array increases, the central beam becomes narrow; as the number of antenna elements increases, side robes become small.

Figure 4:
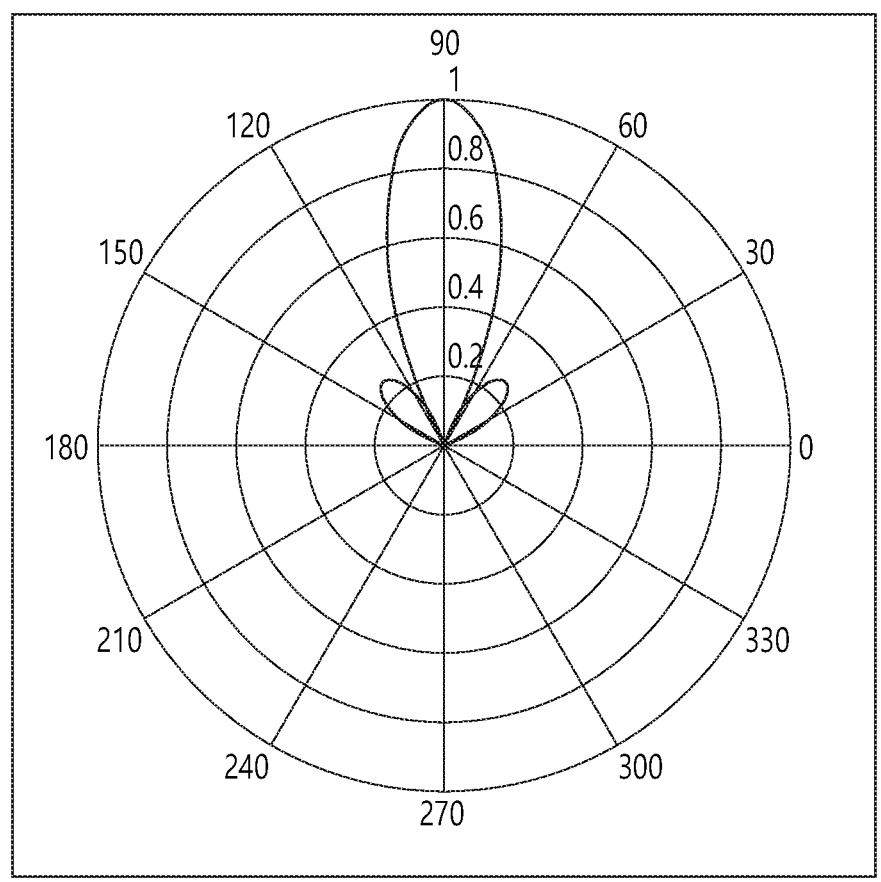
FIG. 4 illustrates a radiation pattern of a linear array antenna.
Figure 4:
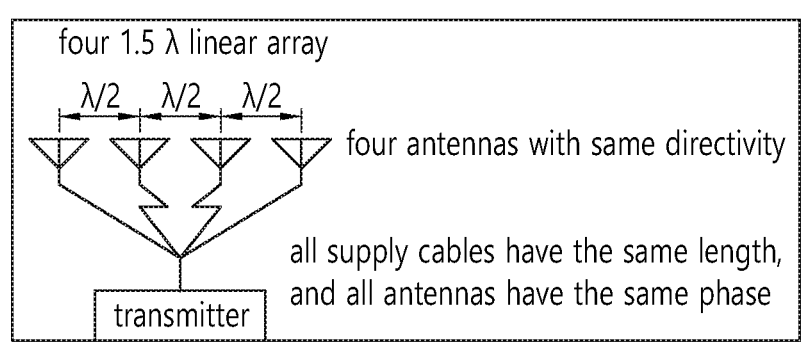

FIG. 4 illustrates a radiation pattern of a linear array antenna.

FIG. 4 shows a radiation pattern of four small antenna elements disposed at an interval of $\lambda/2$. The radiation pattern of the linear array may be represented by a radiation pattern of a single antenna multiplied by an array factor (AF) representing impact of constructive interference and destructive interference of each antenna signal. That is, the array factor represents a change in maximum antenna gain according to a beam width.

Figure 5:
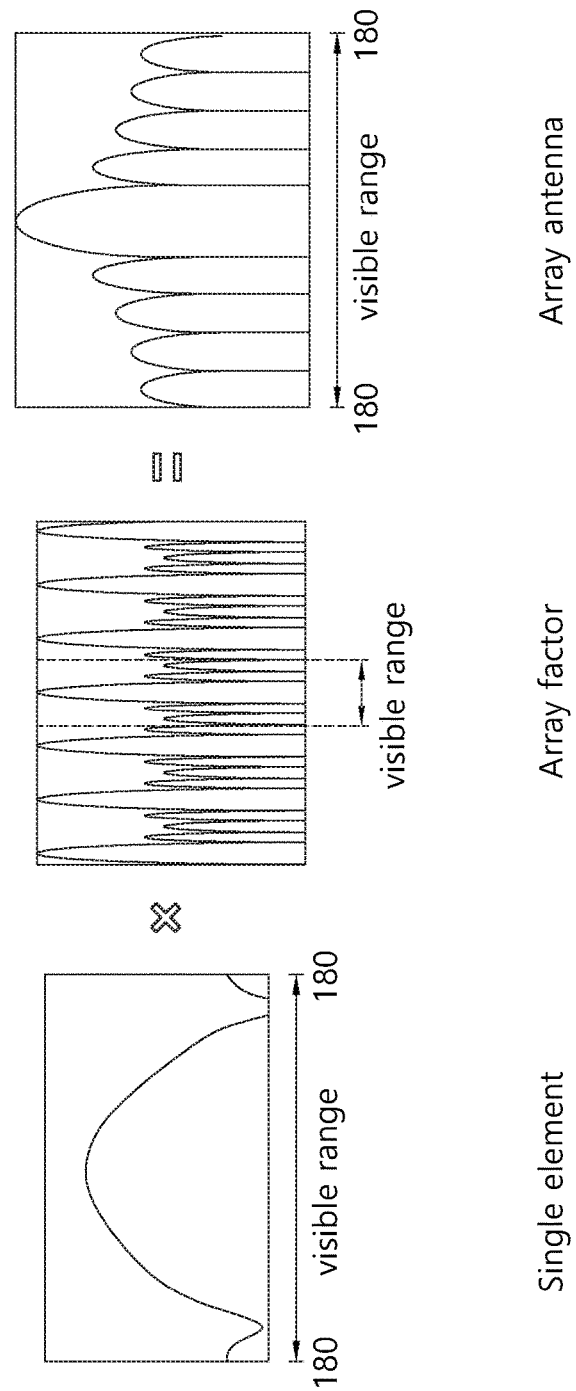
FIG. 5 illustrates a process of obtaining a radiation pattern of a linear array antenna.

FIG. 5 illustrates a process of obtaining a radiation pattern of a linear array antenna.

Referring to FIG. 5, an antenna gain may be obtained by multiplying a radiation pattern $E_r(\omega)$ of a single antenna (single element) by an array factor. An array factor may be changed based on the number of antennas forming an antenna array, the distance between antennas, and a weight by which each antenna is multiplied. The array factor may be represented by Equation 1.

$$AF(\theta) = \sum_{n=1}^{N_T} w_n e^{j(n-1)(kd\cos\theta + \phi)}$$ [Equation 1]

In Equation 1, $N_T$ denotes the number of antennas, $w_n$ denotes a weight for each antenna, d denotes the distance between antennas, $k=2\pi/\lambda$ denotes a wave number, $\theta$ denotes an angle from a directing point of an antenna array, and $\phi$ denotes a phase offset.

That is, when the heading direction ($\theta$) of a beam from an antenna array is 0 and antennas are disposed at equal intervals, array factor values are expressed to be laterally symmetrical based on the heading direction. If a base station transmits a signal in a direction rotated through x degrees based on a boresight to which the antenna heads, an antenna gain at a directing point of a beam may be represented by $E_r(x)AF(0)$. Further, a beam gain at a point rotated through y degrees based on the directing point of the beam may be represented by $E_r(x+y)AF(y)$ A window (vision region) of an AF may be shifted according to $\theta$ applied to the AF, and a final antenna gain is obtained by multiplying the window and a corresponding antenna radiation pattern.

Figure 6:
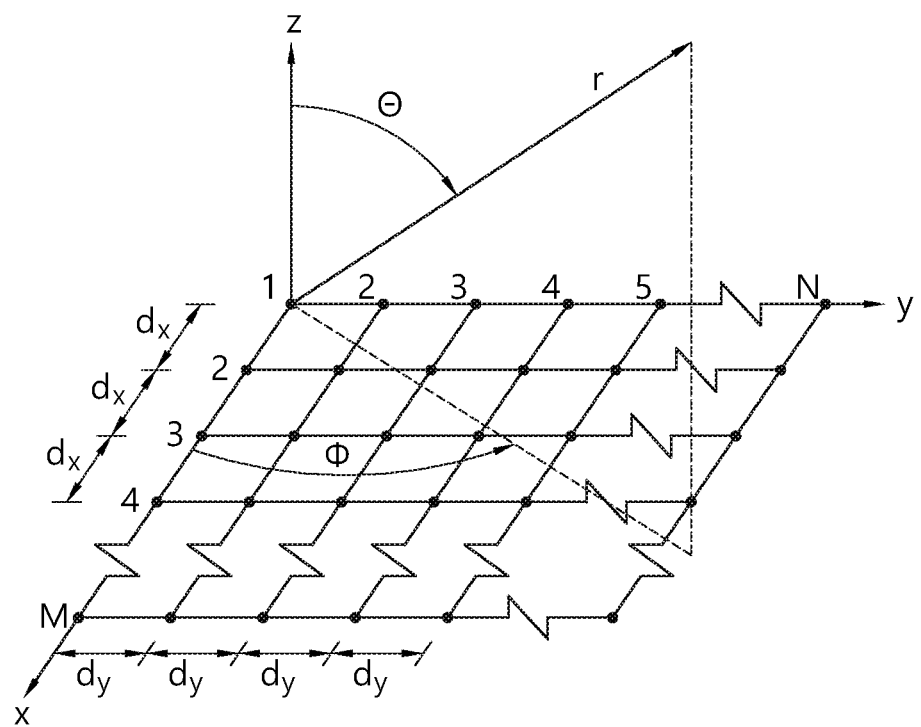
FIG. 6 illustrates an antenna array arranged in two dimensions.

FIG. 6 illustrates an antenna array arranged in two dimensions.

Referring to FIG. 6, antennas may be arranged at regular intervals in horizontal and vertical directions. $\theta$ denotes an azimuth angle, and $\phi$ denotes a vertical angle. dx and dy denote horizontal and vertical intervals between antenna elements. When antennas are arranged as in FIG. 6, AF may be represented by Equation 2.

$$AF(\theta,\phi) = AF_H(\theta,\phi)AF_V(\theta,\phi)$$ [Equation 2]

In Equation 2, $AF_H$ and $AF_V$ may be represented by Equation 3 and Equation 4, respectively.

$$AF_H(\theta,\phi) = \sum_{n=1}^{N} w_{1n} e^{j(n-1)(kd_y \sin\theta\sin\phi + \beta_y)}$$ [Equation 3]

$$AF_V(\theta,\phi) = \sum_{m=1}^{M} w_{m1} e^{j(m-1)(kd_x \sin\theta\cos\phi + \beta_x)}$$ [Equation 4]

Similarly, a radiation pattern of a single antenna may also be represented using parameters $\theta$ and $\phi$ by $E_r(\theta,\phi)$. Meanwhile, in a system, such as coordinated multipoint (CoMP) between base stations, base stations may exchange interference information and may perform user equipment (UE) scheduling based on the interference information.

Hereinafter, a self-organizing network (SON) is described.

An SON is one of important technologies for automatically initializing and managing small cells when a relatively larger number of small-cell base stations are disposed than a macro base station. The SON technology operates in divided processes: self-configuration that enables automatic configuration of configuration information on a base station at the initial installation and operation of the base station; self-optimization as an operation process for optimization of neighboring cell management and coverage parameter configuration; and self-healing for error detection and healing during an operation.

Self-configuration functions are functionalities in which parameters necessary for an initial operation of a base station are autonomously collected and analyzed at the installation of a new or additional base station to automate processes of identifying a neighboring base station, establishing/registering a relationship, and establishing a connection to a core network prior to an initial booting up process and operation of a base station.

Self-optimization functions include an inter-cell interference coordination (ICIC) function of minimizing interference between base stations using information on types of signals and traffic between neighboring base stations in operating a base station, a coverage and capacity optimization (CCO) function for coverage hole detection and for optimal capacity and coverage, a random access channel (RACH) optimization (RO) function for optimal use of an RACH, a mobile load balancing (MLB) function for balancing loads between neighboring base stations, a mobility robustness optimization (MRO) function of optimizing a handover parameter for minimal radio link failure (RLF) at a handover, and an energy saving (ES) function of minimizing unnecessary base station operation time to save power.

Self-healing functions are functionalities in which a failure of a component occurring during a network operation is recognized and automatically restorable components are restored to solve an error and to minimize impacts of the error on a system. In the self-healing functions, alarms raised in the occurrence of a failure of equipment are monitored, additional relevant information is collected through measurement or inspection when an alarm is raised, and a corresponding recovery operation is performed if automatic recovery is possible. In a case of software failures, for the recovery operation, system initialization, backup software reinstallation, start of failure recovery software, downloading a new software unit, and reconfiguration may be performed. In a case of hardware failures, extra back hardware is operated if available, while operations may be performed with reduced performance or functions if extra hardware is unavailable.

Hereinafter, the MRO function among the self-optimization functions is described.

MRO is an SON operation for automatically optimizing corresponding handover settings based on a report on radio connection failure of a UE and connection reconfiguration information in order to reduce handover failure that occurs in cell configuration for mobility. That is, MRO is intended to automatically optimize influential parameters in an active-mode handover and an idle-mode cell reselection, thereby increasing user sensory quality and performance MRO is generally based on the assumption of a fixed cell area and is at least based on the assumption of an infrequently changing configuration. However, when the area is dynamically changed by an active antenna system (AAS), optimization can be achieved through sufficient time.

A typical handover parameter optimization method performed by a mobile carrier is a method of collecting post-processing a related system log through a test run. Handover ping pong, a handover failure, and an RLF, which may be incurred by wrong handover parameter settings, may cause deterioration in user sensory quality and waste of network resources. Thus, MRO is primarily intended to reduce the number of RLFs related to a handover.

Further, handover parameter settings which are not completely optimized may not cause an RLF but lead to deterioration in service performance. For example, inappropriate handover hysteresis settings cause a handover ping pong phenomenon or an excessive delay time with respect to a target cell. Therefore, an MRO algorithm is secondarily intended to reduce inefficient use of network resources due to unnecessary or wrong handover decisions.

Figure 7:
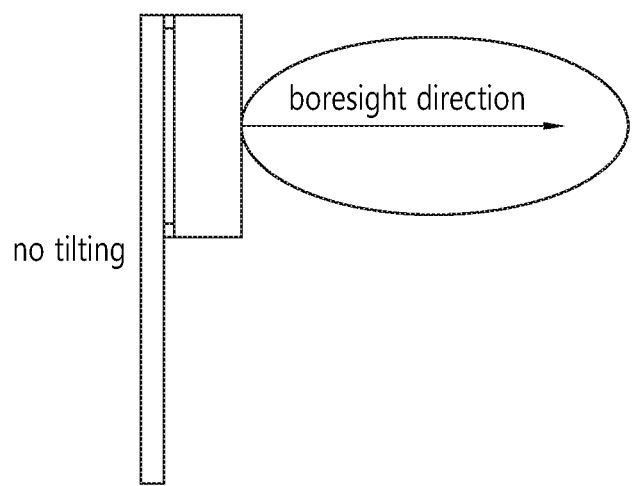
FIGS. 7 to 9 illustrate an antenna tilting method.
Figure 8:
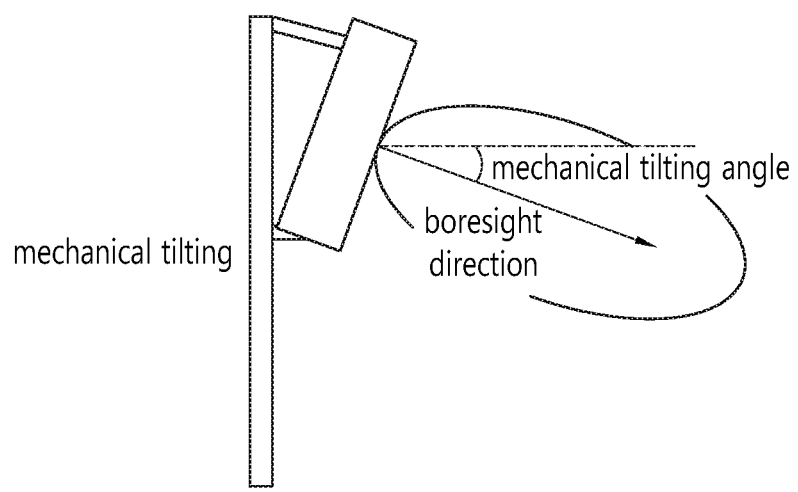
Figure 9:
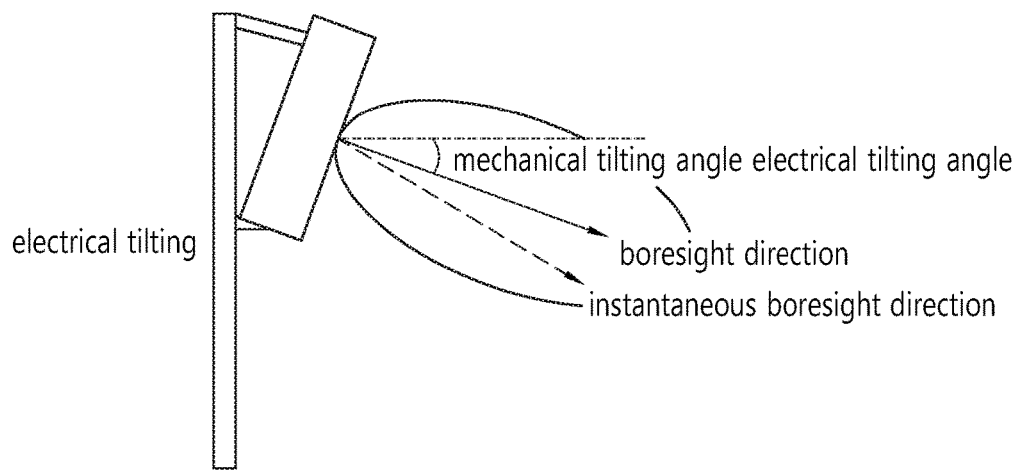

FIGS. 7 to 9 illustrate an antenna tilting method.

FIG. 7 illustrates a case that antenna tilting is not performed, FIG. 8 shows mechanical tilting, and FIG. 9 represents electrical tilting.

A conventional cellular system has adopted a method for reducing, by a BS, inter-cell interference based on mechanical tilting or electrical tilting and improving a Signal to Interference-plus-Noise Ratio (SINR) of UEs in the cell. However, in the case of mechanical tilting of FIG. 8, there is a disadvantage that the beam direction is fixed in the initial installation and that since a mechanical tilting angle is determined according to the height of a building where the BS is to be installed and the height of a support, a radiation beam width needs to be wider. In the case of electrical tilting of FIG. 9, it has a downside in that a tilting angle may be changed by using an internal phase shift module, but only very restrictive vertical beamforming is possible due to actually cell-fixed tilting. When an Active Antenna System (AAS) is employed, free horizontal beamforming and/or vertical beamforming may be implemented, compared with conventional tilting.

Figure 10:
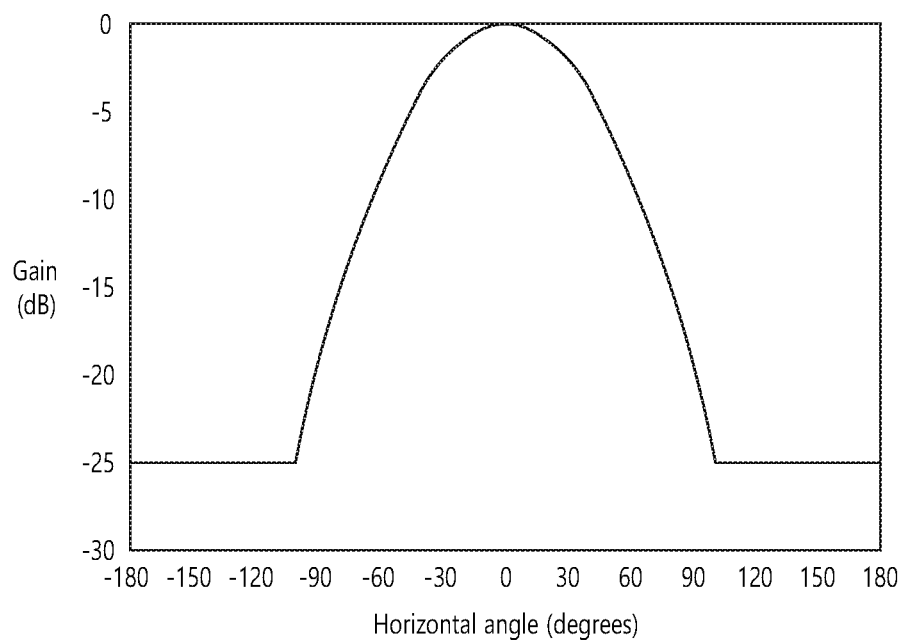
FIG. 10 and FIG. 11 illustrate a pattern of a beam generated by a BS in the case of considering conventional electrical tilting.
Figure 11:
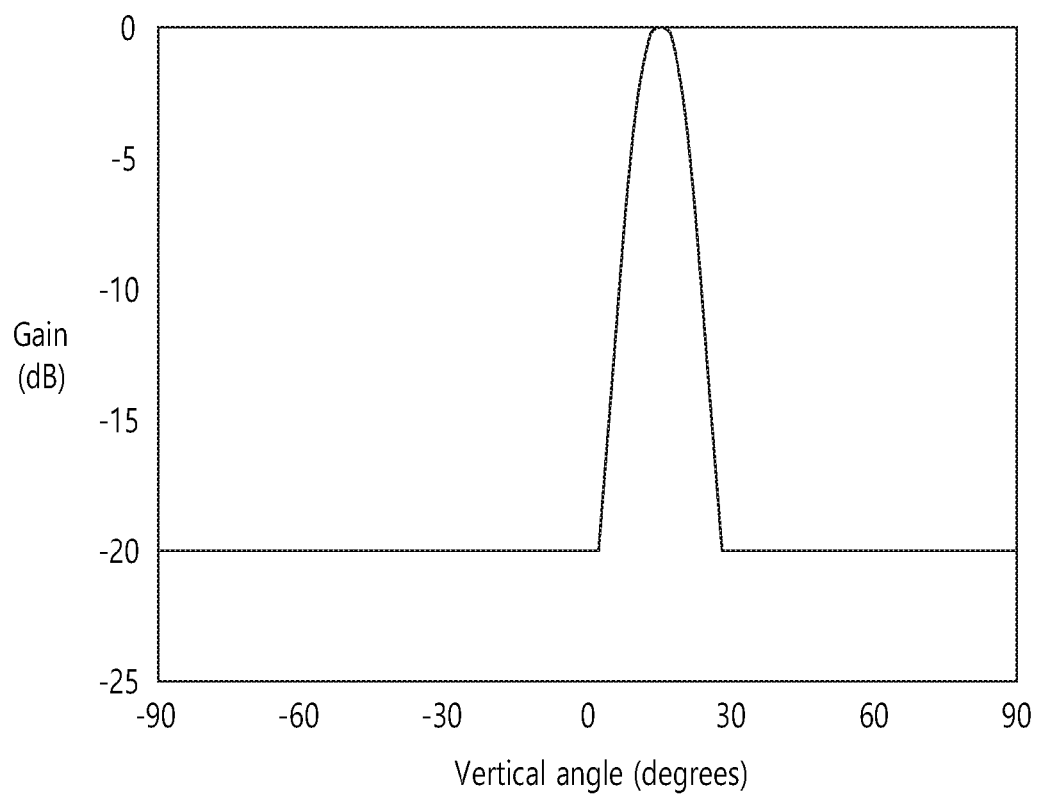

FIG. 10 and FIG. 11 illustrate a pattern of a beam generated by a BS in the case of considering conventional electrical tilting.

FIG. 10 illustrates a general horizontal beam pattern, and FIG. 11 shows a vertical beam pattern when it is assumed that an electrical tilting angle is 15 degrees.

The beam characteristics of an antenna considered in the 3GPP or generally known may have the following values. The vertical beam width may have an angle of about 10° to about 15° based on a Half Power Beam Width (HPBW) standard, and the horizontal beam width may have an angle of about 65° to about 70° based on the HPBW standard. Here, the HPBW means a beam considering 3 dB gain attenuation. The HPBW may represent a sharpness of the main lobe using physical quantity that indicates a directivity level, as an order angle. A smaller HPBW means that a beam has sharper directivity. Using an active antenna may secure a wider beam width than a pattern of a beam generated by a BS in the case of using electrical tilting.

Figure 12:
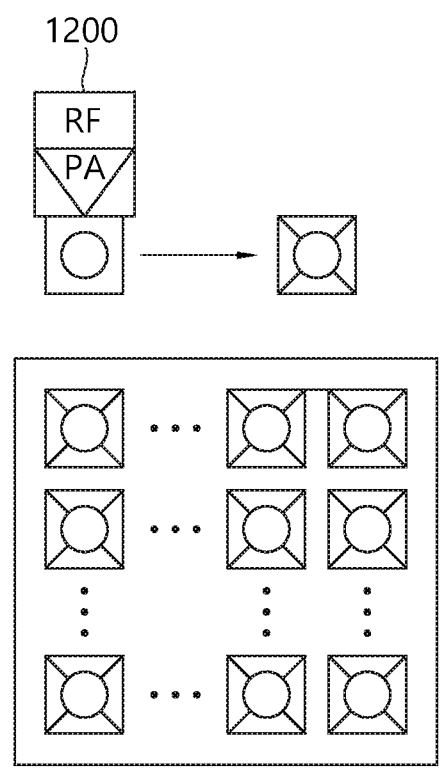
FIG. 12 illustrates an Active Antenna System (AAS).

FIG. 12 illustrates an Active Antenna System (AAS).

Referring to FIG. 12, the AAS is realized in the form of coupling a Radio Frequency (RF) module 1200 to each antenna that is a passive device unlike a conventional passive antenna system. The AAS includes the RF module 1200, i.e. an active device, in each antenna, adjusting power and phase of each antenna module. The AAS may improve matters related to antenna performance (e.g., an increase in the effective length of a small antenna, an increase in bandwidth, a reduction in a coupling and noise reduction, between array devices, or improved transmission power efficiency), enables high integration in connection with Microwave Integrated Circuit (MIC) and Monolithic Microwave Integrated Circuit (MMIC) technologies and, in particular, may recover a shortcoming caused by a high loss due to a transmission line, limited source power, a reduction in antenna efficiency, or a lack of a phase shifter with excellent performance when applied to millimeter wave band communication systems. Since each antenna is coupled to the RF module 1200, each antenna can be controlled per port and adjusted in phase and output to suit communication environments and situations.

Figure 13:
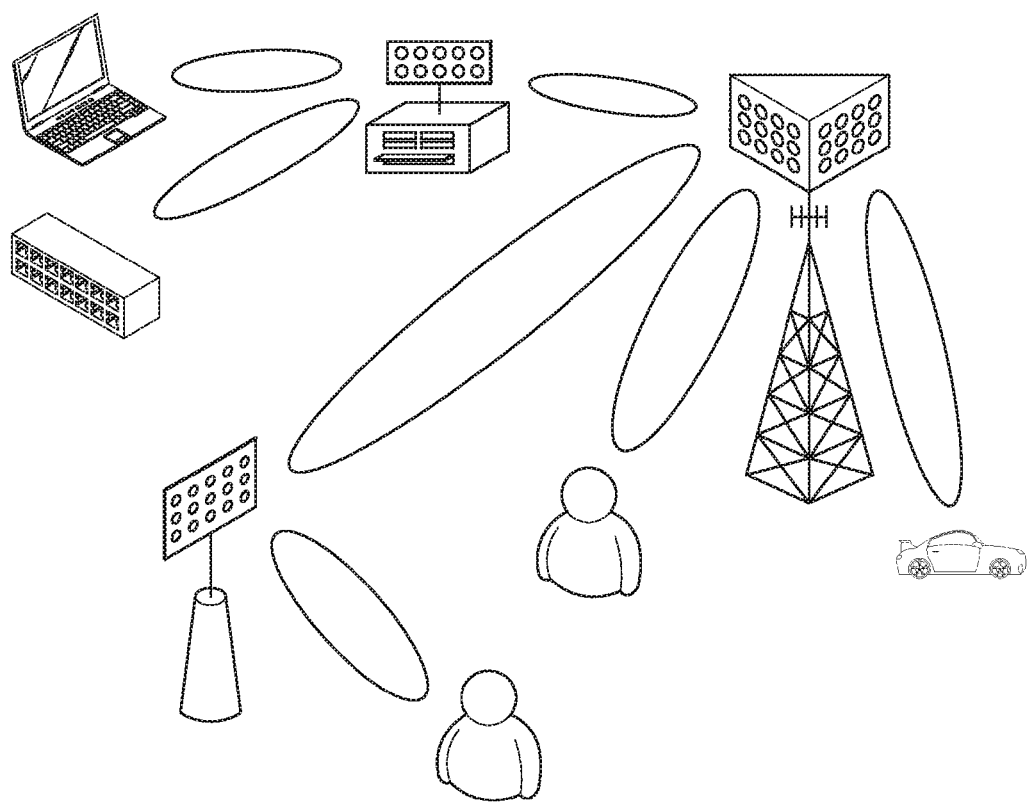
FIG. 13 illustrates a method for transmitting a UE-specific beam based on an active antenna.

FIG. 13 illustrates a method for transmitting a UE-specific beam based on an active antenna.

Referring to FIG. 13, in the case of using an active antenna, the beam direction is adjusted in a corresponding direction with respect to a certain target to control power based on the location of the target, performing beamforming to the target.

Figure 14:
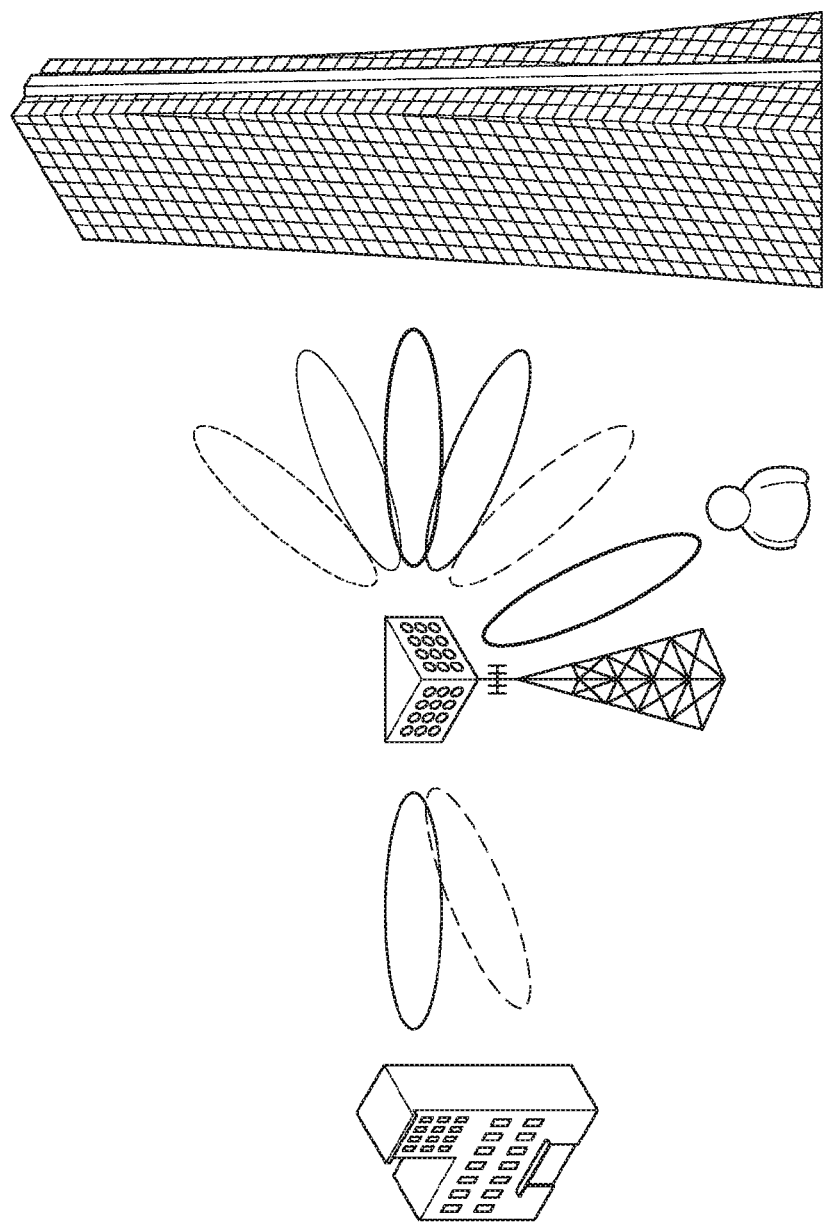
FIG. 14 illustrates a method for transmitting a UE-specific beam based on an active antenna.

FIG. 14 illustrates a method for transmitting a UE-specific beam based on an active antenna.

A transmission environment using the 2D active antenna array might mainly include an Outdoor to Indoor (O2I) environment where an external BS transmits a signal to an indoor UE and an outdoor urban micro cell environment. Referring to FIG. 14, transmitting a beam using the 2D active antenna array allows a BS to enable UE-specific horizontal beam steering and vertical beam steering considering various UE heights according to building heights, being used in a real cell environment where a plurality of various buildings exists in a cell. A cell environment where a plurality of buildings with various heights in a cell exists may be taken into consideration. In this case, channel characteristics and the like that are very different from a conventional wireless channel environment may be considered. For example, a beam may be steered in consideration of a change in shade/path loss according to height difference, a change in the fading characteristics including Line of Sight (LoS)/Non-Line of Sight (NLoS), and Direction of Arrival (DoA), etc.

AAS technology generally includes beamforming, cell shaping, and cell splitting techniques.

In beamforming, radio resource management (RRM) is performed by changing a beam within a short time without changing a cell area. Thus, the entire cell area uses the same PCI and beam control is performed autonomously by a base station. It is considered that additional improvement in an SON shape is not needed.

Figure 15:
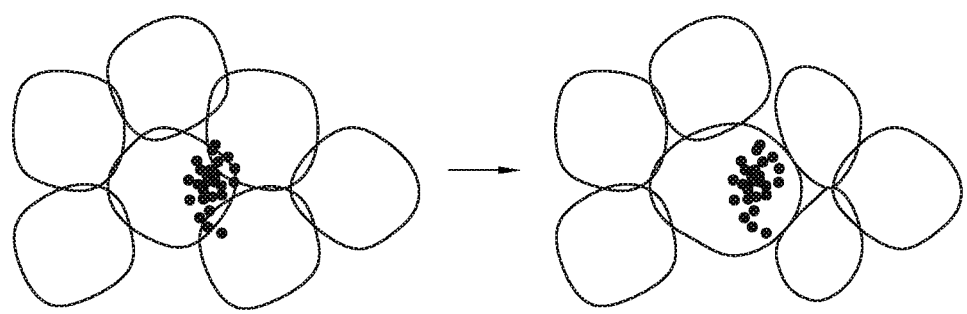
FIG. 15 illustrates impact on a neighboring cell when a cell shape is changed.

FIG. 15 illustrates impact on a neighboring cell when a cell shape is changed.

The cell shaping technique changes a cell area using an AAS over one hour or even longer time. The entire cell area uses the same PCI, a change of a relevant cell is controlled by operations, administration, and maintenance (OAM), and an MRO problem may occur depending on a degree of cell change.

Figure 16:
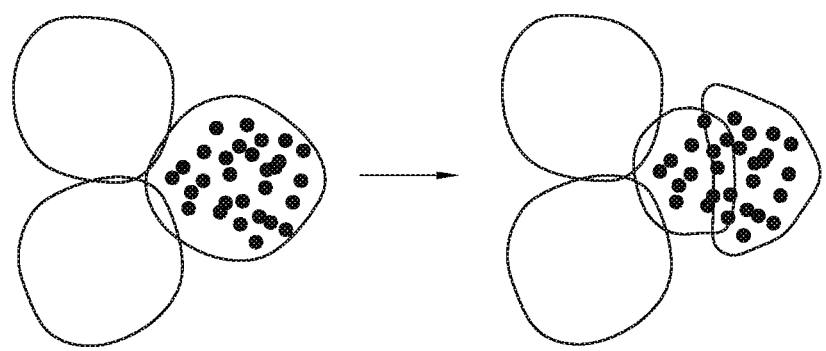
FIG. 16 illustrates vertical cell splitting according to user traffic.

FIG. 16 illustrates vertical cell splitting according to user traffic.

In cell splitting, a cell sector may be split horizontally or vertically, may be dynamically split by time, and may be split several times for from one hour to several days. Cell splitting is configured by OAM and may cause impact on MRO in connection with the existing SON operation. Referring to FIG. 16, which illustrates vertical cell splitting, when UEs are evenly distributed in a cell, the cell is divided into two sectors for use, thereby increasing cell capacity. In a cell splitting scenario, an area designated in advance by OAM, not by a base station, is split according to network loads or a user service demand. An RAN may send MDT measurement data or statistical data for OAM optimization. Cells may be repeatedly split and merged, which is depending on a network condition. Cell splitting is performed considering both scenarios of using the same frequency and using different scenarios.

Figure 17:
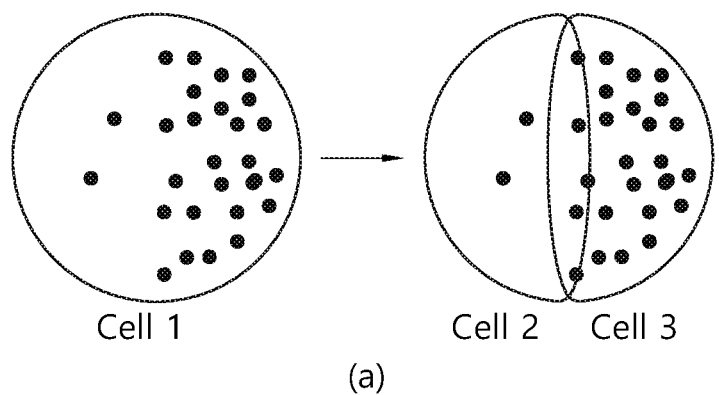
FIG. 17 illustrates two patterns of cell splitting to describe efficient cell splitting.
Figure 17:
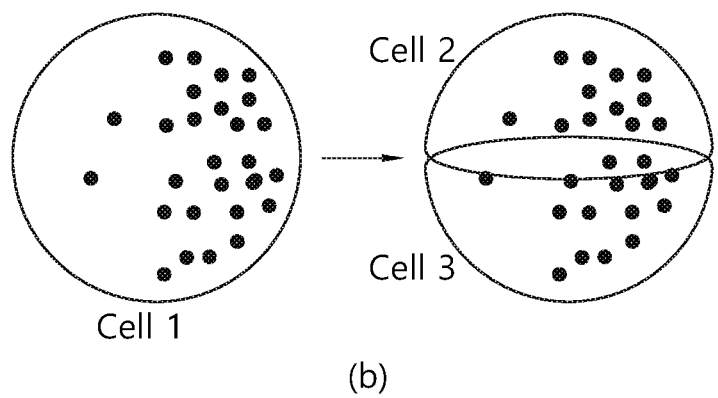

FIG. 17 illustrates two patterns of cell splitting to describe efficient cell splitting.

Referring to FIG. 17, it is assumed that cell 1 is split into two cells, cell 2 and cell 3 and spatial distribution of traffic is the same in FIG. 17(a) and FIG. 17(b). FIG. 17(b) is more useful than FIG. 17(a) in that current traffic is distributed. Cell 2 and cell 3 share traffic in FIG. 17(b), while cell 2 is hardly used and cell 3 is responsible for most of the loads of cell 1 before cell splitting in FIG. 17(a). That is, if cell 1 supports various patterns of cell splitting, cell 1 may select a suitable pattern for cell splitting based on traffic distribution. Each cell splitting pattern is a set of parameters for cell splitting, which may be defined in advance by OAM. If cell 1 is split as in FIG. 17, an E-UTRAN cell global identifier (ECGI) of each split cell may be used to indicate another cell splitting pattern to a neighboring cell. That is, an ECGI of each split cell may be transmitted to a neighboring cell using an X2 procedure (for example, an eNB configuration procedure). However, this method may cause a problem in the following cases, which are described below with reference to FIGS. 18 and 19.

Figure 18:
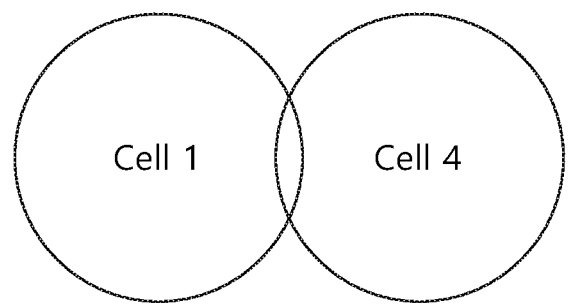
FIG. 18 illustrates an embodiment of a case where a base station does not recognize whether a cell of a neighboring base station is split when the foregoing method is applied.
Figure 18:
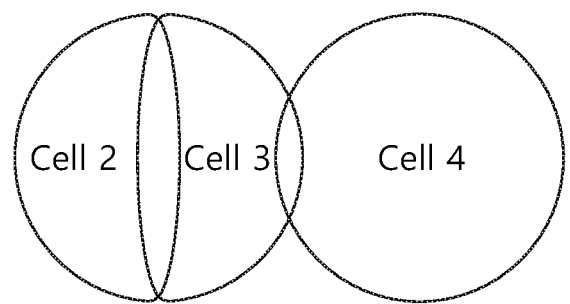

FIG. 18 illustrates an embodiment of a case where a base station does not recognize whether a cell of a neighboring base station is split when the foregoing method is applied.

Referring to FIG. 18, when cell 1 in FIG. 18(a) is split as in FIG. 18(b), cell 2 is not a neighboring cell to cell 4 anymore, and thus cell 4 may receive only an ECGI of cell 3. Although cell 1 is split into two cells, cell 4 receives only one ECGI and thus may not recognize whether the received ECGI indicates cell splitting. If ECGI modification is recognized by a network, although cell splitting is performed, a set of MRO parameters defined in advance for cell splitting may not be applied.

Figure 19:
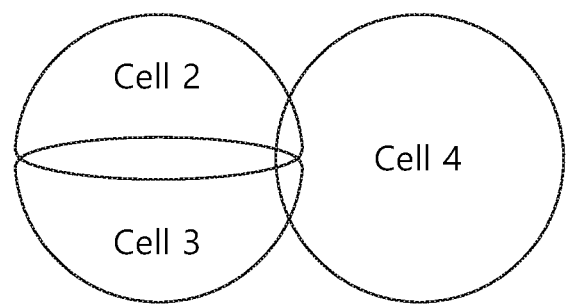
FIG. 19 illustrates an embodiment of a case where a base station does not recognize a shape of a split cell of a neighboring base station when the foregoing method is applied.
Figure 19:
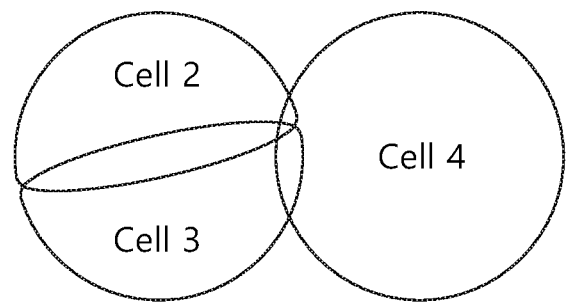

FIG. 19 illustrates an embodiment of a case where a base station does not recognize a shape of a split cell of a neighboring base station when the foregoing method is applied.

Referring to FIG. 19(a), when cell splitting is performed, cell 4 may receive ECGIs of neighboring cells, cell 2 and cell 3. Referring to FIG. 19(b), cell 4 may receive ECGIs of neighboring cells, cell 2 and cell 3, likewise. In these two examples, when the numbers of split cells are the same, cell splitting patterns may not be distinguished, and accordingly the same set of MRO parameters defined in advance may be applied. That is, in the above examples, although FIGS. 19(a) and (b) have different cell splitting patterns, the same set of MRO parameters may be applied. The present invention proposes a method for solving the above problems.

Figure 20:
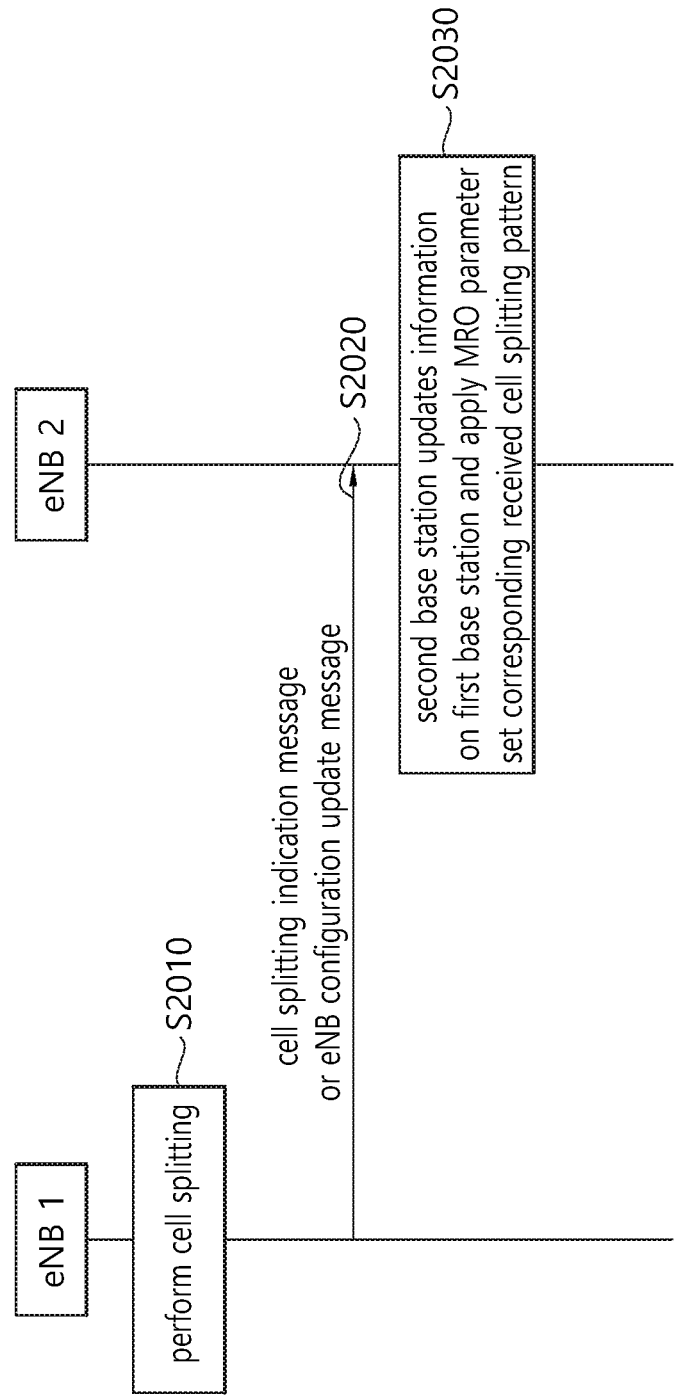
FIG. 20 illustrates a method of indicating a cell splitting pattern to a neighboring base station using an X2 interface according to an embodiment of the present invention.

FIG. 20 illustrates a method of indicating a cell splitting pattern to a neighboring base station using an X2 interface according to an embodiment of the present invention.

Proposed is a method for a base station that performs cell splitting to indicate a cell splitting pattern to a neighboring interface having an X2 connection to the base station. A cell splitting pattern may be defined as any one of a set, mode, and case representing possible shapes of split cells when cell splitting is performed.

Referring to FIG. 20, a first base station may perform cell splitting based on a current state of the first base station (for example, cell loads and spatial distribution of traffic, S2010). The first base station may provide a cell splitting pattern to a second base station using a cell splitting pattern indication message (or eNB configuration update message, legacy message, or new information element (IE) included in a new/legacy message, S2020). The cell splitting pattern indication message (or eNB configuration update message, legacy message, or new IE included in the new/legacy message) may include at least one of coverage information and index information. Coverage information denotes information representing a shape of a currently split cell, and index information denotes information indicating a current cell splitting pattern configured and indexed in advance by OAM or between neighboring base stations.

Describing information included in the cell splitting pattern indication message, eNB configuration update message, or legacy message of the present invention in detail, the messages may include information listed below in Table 1.

TABLE 1

| IE/Group Name | IE Type And Reference | Description |
| --- | --- | --- |
| Coverage Modification List | | List of cells with modified coverage |
| ECGI | ECGI | E-UTRAN Cell Global Identifier of the cell to be modified |
| Cell Coverage State | Integer (0 . . . 15, . . . ) | Value '0' indicates that the cell is inactive. Other values Indicates that the cell is active and also indicates the coverage configuration of the concerned cell |

Referring to Table 1, the cell splitting pattern indication message, eNB configuration update message, or legacy message may include a coverage modification list IE indicating a list of coverage-changed cells. The coverage modification list IE may include an ECGI of a coverage-changed cell. Further, the coverage modification list IE may include a cell coverage state IE corresponding to the coverage information. That is, the cell coverage state IE may indicate a shape of a currently split cell. The value of the cell coverage state IE equal to 0 indicates a deactivated cell. For example, when cell 1 is split into cell 2 and cell 3 by cell splitting, cell 1 is deactivated, and thus the value of a cell coverage state IE for cell 1 may be 0. On the contrary, the cell coverage state IE having a value other than 0 indicates an activated cell and indicates a coverage configuration of a coverage-changed cell (that is, a current cell shape).

When the message is received from the first base station, the second base station may update information on the first base station and may apply a set of MRO parameters corresponding to the received cell splitting pattern (S2030). A set of parameter for each cell splitting pattern, which changes when cell splitting is performed, may be defined in advance by OAM between neighboring base station.

Figure 21:
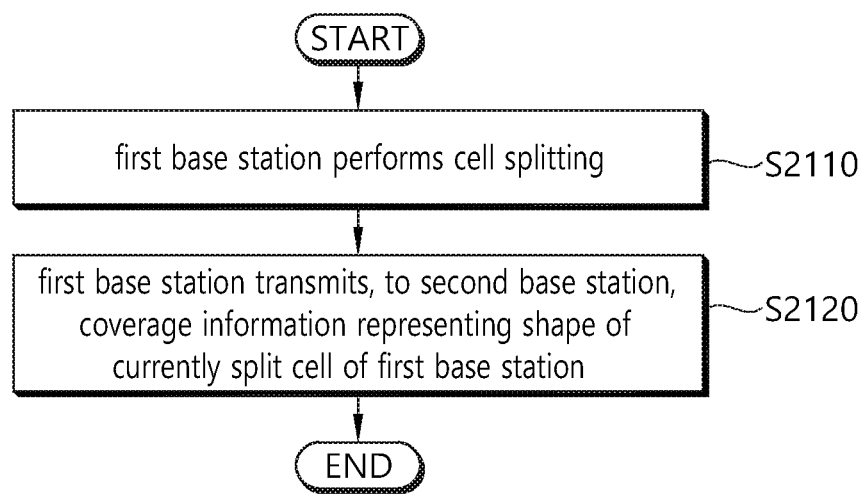
FIG. 21 is a block diagram illustrating a method of indicating a cell splitting pattern to a neighboring base station according to an embodiment of the present invention.

FIG. 21 is a block diagram illustrating a method of indicating a cell splitting pattern to a neighboring base station according to an embodiment of the present invention.

Referring to FIG. 21, a first base station may perform cell splitting (S2110). The first base station may transmit, to a second base station, coverage information that represents a shape of a currently split cell of the first base station (S2120). Here, an X2 connection between the first base station and the second base station may be used, and the coverage information may be transmitted via a cell splitting pattern indication message, eNB configuration update message, or a legacy message.

Figure 22:
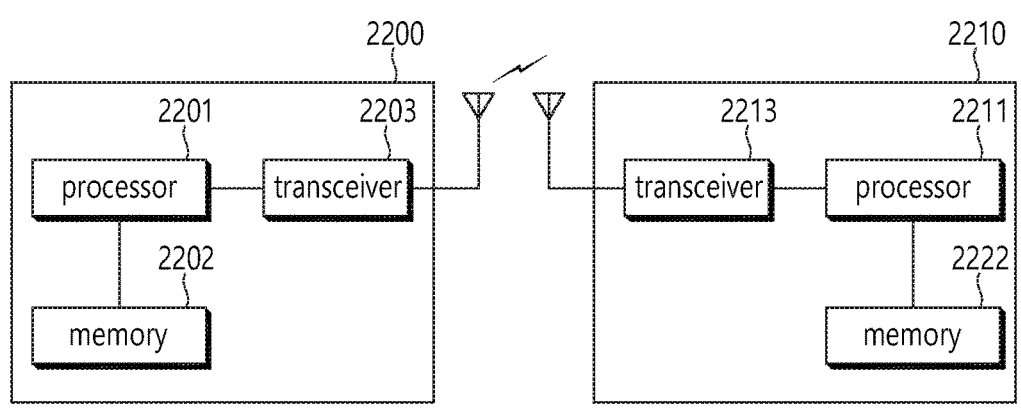
FIG. 22 is a block diagram illustrating a wireless communication system according to the embodiment of the present invention.

FIG. 22 is a block diagram illustrating a wireless communication system according to the embodiment of the present invention.

A BS 2200 includes a processor 2201, a memory 2202 and a transceiver 2203. The memory 2202 is connected to the processor 2201, and stores various information for driving the processor 2201. The transceiver 2203 is connected to the processor 2201, and transmits and/or receives radio signals. The processor 2201 implements proposed functions, processes and/or methods. In the above embodiment, an operation of the base station may be implemented by the processor 2201.

A UE 2210 includes a processor 2211, a memory 2212 and a transceiver 2213. The memory 2212 is connected to the processor 2211, and stores various information for driving the processor 2211. The transceiver 2213 is connected to the processor 2211, and transmits and/or receives radio signals. The processor 2211 implements proposed functions, processes and/or methods. In the above embodiment, an operation of the base station may be implemented by the processor 2211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for a base station to indicate a cell splitting pattern to a neighboring base station, the method comprising:

deactivating a first cell;

activating multiple second cells within a coverage of the first cell;

transmitting, to the neighboring base station, both an identifier of the deactivated first cell and an index for a coverage shape of the deactivated first cell, wherein the index for the coverage shape of the deactivated first cell equals zero, and the zero represents deactivation of the first cell; and transmitting, to the neighboring base station, identifiers of the activated multiple second cells and indices for a coverage shape of the activated multiple second cells, wherein the indices for the coverage shape of the activated multiple second cells equal a value other than zero, and the value other than zero represents both activation of the second cells and the coverage shape of each of the activated multiple second cells.

2. The method of claim 1, further comprising:
transmitting, to the neighboring base station, index information indicating a current cell splitting pattern preconfigured between the base station and the neighboring base station,
wherein the index information is configured per a base station.

3. The method of claim 1, wherein the neighboring base station applies a set of mobility robustness optimization (MRO) parameters, based on the received the identifier of the deactivated first cell, the index for the coverage shape of the deactivated first cell, the identifiers of the activated multiple second cells and the indices for the coverage shape of the activated multiple second cells.

4. The method of claim 3, wherein the set of MRO parameters changes according to the received the identifier of the deactivated first cell, the index for the coverage shape of the deactivated first cell, the identifiers of the activated multiple second cells and the indices for the coverage shape of the activated multiple second cells.

5. The method of claim 1, wherein the identifier of the deactivated first cell, the index for the coverage shape of the deactivated first cell, the identifiers of the activated multiple second cells and the indices for the coverage shape of the activated multiple second cells are is transmitted to the neighboring base station through a cell splitting pattern indication message, an eNB configuration update message, or a different message.

6. The method of claim 2, wherein the index information is transmitted to the neighboring base station through a cell splitting pattern indication message, an eNB configuration update message, or a different message.

7. The method of claim 1, wherein the base station is connected with the neighboring base station via X2.

8. A base station for indicating a cell splitting pattern to a neighboring base station, the base station comprising:
a memory;
a transceiver; and
a processor, to connect the memory and the transceiver, that:
deactivates a first cell;
activates multiple second cells within a coverage of the first cell;
controls the transceiver to transmit, to the neighboring base station, both a identifier of the deactivated first cell and an index for a coverage shape of the deactivated first cell,
wherein the index for the coverage shape of the deactivated first cell equals zero, and the zero represents deactivation of the first cell; and
controls the transceiver to transmit, to the neighboring base station, identifiers of the activated multiple second cells and indices for a coverage shape of the activated multiple second cells,
wherein the indices for the coverage shape of the activated multiple second cells equal a value other than zero, and the value other than zero represents both activation of the second cells and the coverage shape of each of the activated multiple second cells.

9. The base station of claim 8, wherein the processor is configured to:
control the transceiver to further transmit, to the neighboring base station, index information indicating a current cell splitting pattern preconfigured between the base station and the neighboring base station,
wherein the index information is configured per a base station.

10. The base station of claim 8, wherein the identifier of the deactivated first cell, the index for the coverage shape of the deactivated first cell, the identifiers of the activated multiple second cells and the indices for the coverage shape of the activated multiple second cells are is transmitted to the neighboring base station through a cell splitting pattern indication message, an eNB configuration update message, or a different message.

11. The base station of claim 9, wherein the index information is transmitted to the neighboring base station through a cell splitting pattern indication message, an eNB configuration update message, or a different message.

* * * * *